Dec. 1, 1970 FUKUO SHIBATA 3,543,518
ARRANGEMENTS COMBINING A PLURALITY OF PRIME MOVER POWERS
Original Filed June 6, 1967
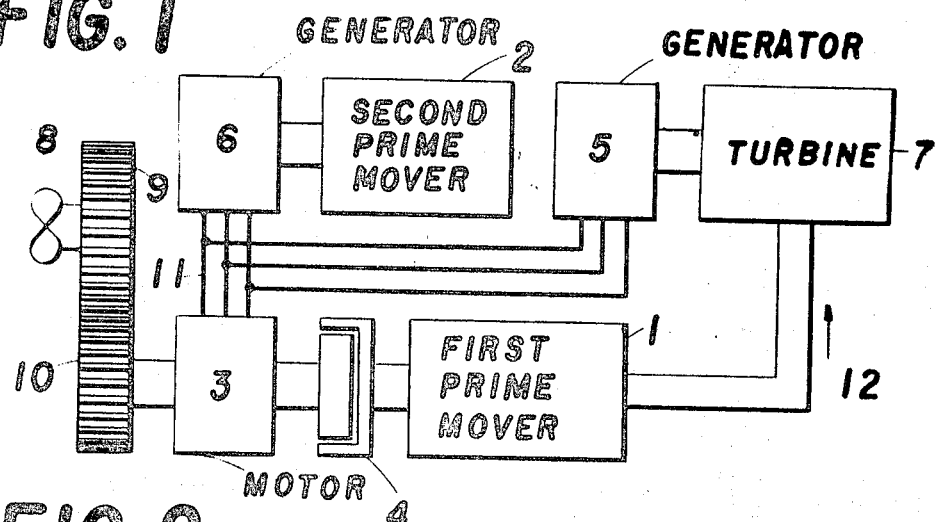
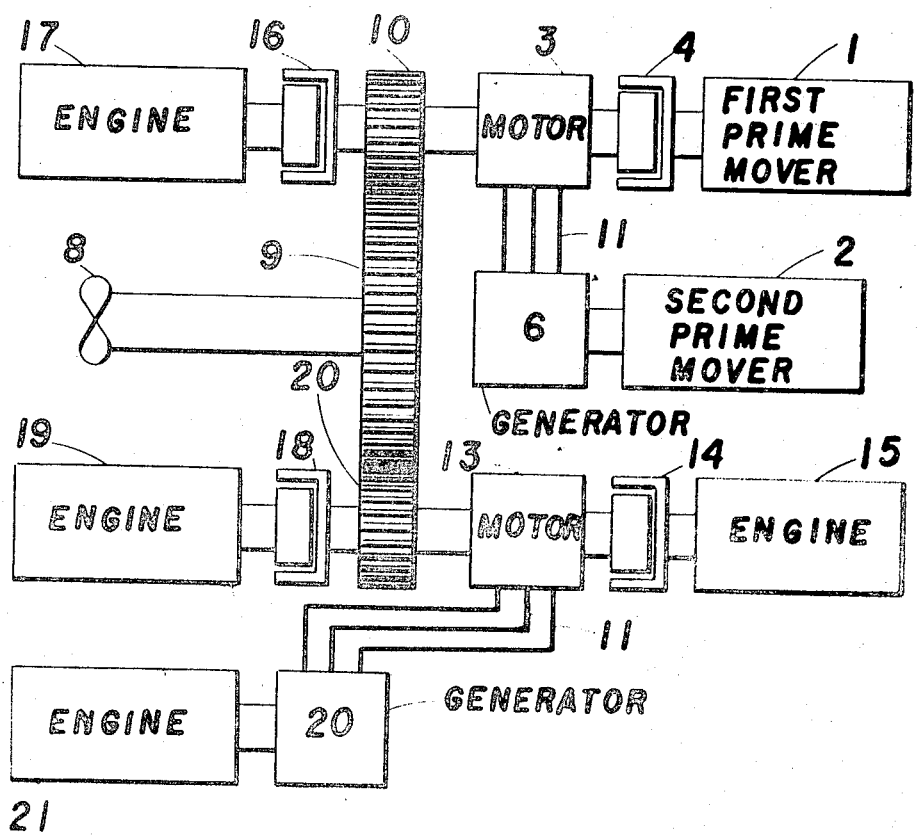
INVENTOR Fukuo Shibata

United States Patent Office 3,543,518
Patented Dec. 1, 1970

3,543,518
ARRANGEMENTS COMBINING A PLURALITY OF PRIME MOVER POWERS
Fukuo Shibata, 13 Tokiwa-cho, Nishinomiya,
Hyogo Prefecture, Japan
Original application June 6, 1967, Ser. No. 645,094, now Patent No. 3,478,619. Divided and this application Nov. 7, 1968, Ser. No. 774,219
Claims priority, application Japan, Aug. 11, 1966, 41/52,719
Int. Cl. F02b 61/00, 41/10, 73/00
U.S. Cl. 60—97
5 Claims

ABSTRACT OF THE DISCLOSURE

In order to drive a load such as a propeller of a ship by combined outputs of a plurality of diesel engines without sacrificing efficiency of operation or economy of apparatus of the arrangements, a combined set of a clutch coupling with an electric motor is installed between a first diesel engine and the load, and the electric motor is supplied with an electric energy from an electric generator driven by a second diesel engine through an electric cable.

---

This application is a division of Ser. No. 645,094, filed June 6, 1967, now Pat. No. 3,478,619.

BACKGROUND OF THE INVENTION

Field of the invention

This invention is used in fields in which it is necessary to combine outputs of a plurality of diesel engines in order to drive a load such as a propeller of a ship, a wheel of a car, a fan, a pump etc. by the plurality of diesel engines.

Description of the prior art

In some prior arrangements in which outputs of a plurality of diesel engines are combined for driving a load, gears are used for combination of outputs of the plurality of diesel engines. For example, in a prior arrangement for driving a load (a propeller) by combination of outputs of four diesels through a gear together with two pinions and flexible couplings such as electromagnetic couplings, an engine plant becomes too long to compact it in a small engine room. In other words, there is a limitation in a total output capacity of engines combined by such a prior arrangement when there is a limit of an output capacity in each engine.

SUMMARY OF THE INVENTION

It is the primary object of the invention to provide an arrangement combining a plurality of diesel engine outputs in which a length of a plant of the diesel engines can be reduced considerably as compared with that of the prior arrangements.

Another object of this invention is to provide an arrangement combining a plurality of diesel engine outputs whose total output capacity can be very large as compared with that of the prior arrangements, without sacrificing efficiency of operation or economy of apparatus of the arrangement.

An additional object of this invention is to provide an arrangement combining outputs of a plurality of diesel engines any one of which can be stopped from running whilst keeping the others operating.

A further object of this invention is to make it possible to reduce considerably a space of an engine room of a vessel whilst keeping a total output capacity of combined engines large.

Other objects of this invention will in part be obvious and in part appear hereinafter.

Accordingly, this invention is disclosed in the embodiments thereof shown in the accompanying drawings and comprises the features of construction, combination of elements and arrangement of parts which will be indicated in the appended claims.

BRIEF DESCRIPTION OF THE DRAWING

Referring to the drawing:

FIG. 1 illustrates diagrammatically one embodiment of this invention.

FIG. 2 illustrates diagrammatically another embodiment of this invention.

DESCRIPTION OF THE PREFERRED EMBODIMENTS

As shown in FIG. 1, an arrangement of this invention combining outputs of a plurality of diesel engines 1 and 2 has a combination of: a first diesel engine 1 from which a mechanical power to drive a load can be derived; a flexible clutch coupling 4 which is coupled mechanically with and driven by the said first diesel engine 1; an electric alternating current motor 3 which is coupled mechanically between the said flexible clutch coupling 4 and the said load 8 driven by the said first diesel engine 1; a gear 9 which is provided between the said electric alternating current motor 3 and the said load 8, and which is coupled mechanically with the said first diesel engine 1 through the said electric alternating current motor 3 and the said flexible clutch coupling 4 in turn; a second diesel engine 2 having a rotating shaft from which a mechanical power can be derived and which is not coupled mechanically with the said gear 9; an electric alternating current generator 6 which is coupled mechanically with and driven by the rotating shaft of the said second diesel engine 2; an electric cable 11 which connects between the said electric alternating current generator 6 and the said electric alternating current motor 3, wherein an electric power converted by the said electric alternating current generator 6 from the mechanical power of the said second diesel engine 2 is transmitted to the said electric alternating current motor 3, consequently, the said load 8 can be driven by the power which flows into the electric alternating current motor 3 from the said electric alternating current generator 6 through the said electric cable 11 and which is combined with the power transmitted from the mechanical power of the first diesel engine through the said flexible clutch coupling 4 and the electric alternating current motor 3.

In FIG. 1, a three phase alternating current generator 6 is shown as an example of the electric generator. A hydraulic coupling, an air coupling, an electromagnetic coupling and so forth are respectively used as examples of the flexible clutch coupling 4. A gear 9 and a pinion 10 are inserted between the load 8 and a flexible clutch coupling 4 and an electric alternating current motor 3. The turbine 7 driven by the exhaust gas energy of the diesel 1 is arranged to drive a generator 5 which is connected electrically in parallel with the electric alternating current generator 6 driven by the second diesel engine 2.

In FIG. 2, the load 8 is driven by the total outputs of the diesel engines 1, 2, 15, 17, 19 and 21. Flexible couplings 4, 14, 16 and 18 are inserted respectively between the diesel engine 1 and the electric alternating current motor 3, between the diesel engine 15 and the electric alternating current motor 13, between the diesel engine 19 and the pinions 10 and 20. The three phase alternating current motor 3 is supplied with electric power from an alternating current generator 6 driven by the diesel engine 2 through the electric cable 11, and the three phase alternating current motor 13 is supplied with electric power from an alternating current generator 20 driven by the diesel engine 21 through the electric cable 11.

In FIG. 1 and FIG. 2, flexible couplings 4 and 14 are coupled and driven by the diesel engines 1 and 15, and further, electric motors 3 and 13 are coupled between the said flexible couplings 4, 14 and the load 8 driven by the said diesel engines 1 and 15. Therefore, when the operations of the flexible couplings 4, 14 are taken off, the diesel engines 1, 15 can be stopped from running whilst keeping the other diesel engines 2, 21 operating. Further, when electric feeding from the generator 6 to the motor 3 is taken off, the motor 3 can be driven under no load condition.

According to this invention, the second diesel engine 2 is not coupled mechanically with the gear 9. Therefore, the second diesel engine can be arranged in a space free from the first diesel engine or the gear. Accordingly, many diesel engines can be arranged compact in a small space such as an engine room of a ship. The total output capacity of these diesel engines which are coupled mechanically and electrically with each other can be very large.

In FIG. 1, a symbol 12 shows a flow of the exhaust gas energy flowing from the diesel engine 1 to the turbine 7.

What I claim is:

1. An arrangement combining a plurality of diesel engine outputs which has a combination of: a first diesel engine from which a mechanical power to drive a load can be derived; a flexible clutch coupling which is coupled mechanically with and driven by the said first diesel engine; an electric alternating current motor which is coupled mechanically between the said flexible clutch coupling and the said load driven by the said first diesel engine; a gear which is provided between the said electric alternating current motor and the said load, and which is coupled mechanically with the said first diesel engine through the said electric alternating current motor and the said flexible clutch coupling in turn; a second diesel engine having a rotating shaft from which a mechanical power can be derived and which is not coupled mechanically with the said gear; an electric alternating current generator which is coupled mechanically with and driven by the rotating shaft of the said second diesel engine; an electric cable which connects between the said electric alternating current generator and the said electric alternating current motor, wherein an electric power converted by the said electric alternating current generator from the mechanical power of the said second diesel engine is transmitted to the said electric alternating current motor, consequently, the said load can be driven by the power which flows into the electric alternating current motor from the said electric alternating current generator through the said electric cable and which is combined with the power transmitted from the mechanical power of the first diesel engine through the said flexible clutch coupling and the electric alternating current motor.

2. An arrangement combining a plurality of diesel engine outputs as claimed in claim 1, wherein a flexible clutch coupling is composed of a hydraulic coupling.

3. An arrangement combining a plurality of diesel engine outputs as claimed in claim 1, wherein a flexible clutch coupling is composed of an air coupling.

4. An arrangement combining a plurality of diesel engine outputs as claimed in claim 1, wherein a flexible clutch coupling is composed of an electromagnetic coupling.

5. An arrangement combining a plurality of diesel engine outputs as claimed in claim 1, wherein a turbine driven by an exhaust gas energy of the first diesel engine is arranged to drive a generator which is connected electrically in parallel with the electric alternating generator driven by the second diesel engine.

References Cited

UNITED STATES PATENTS

| 1,682,358 | 8/1928 | Sperry | 60—97 |
| 1,943,369 | 1/1934 | Coates | 60—6 |
| 2,746,256 | 5/1956 | Fell | 60—97 |
| 2,760,611 | 8/1956 | Jaeschke | 192—.098 |
| 3,369,636 | 2/1968 | Nelson | 192—.098 XR |

FOREIGN PATENTS 551,494  2/1943  Great Britain.

MARTIN P. SCHWADRON, Primary Examiner

R. BUNEVICH, Assistant Examiner

U.S. Cl. X.R.

60—6, 13; 192—.098